Nov. 3, 1959        C. A. LONG, JR        2,911,296
PROCESS AND APPARATUS FOR TREATING IRON ORE
Filed Jan. 7, 1957        3 Sheets-Sheet 1
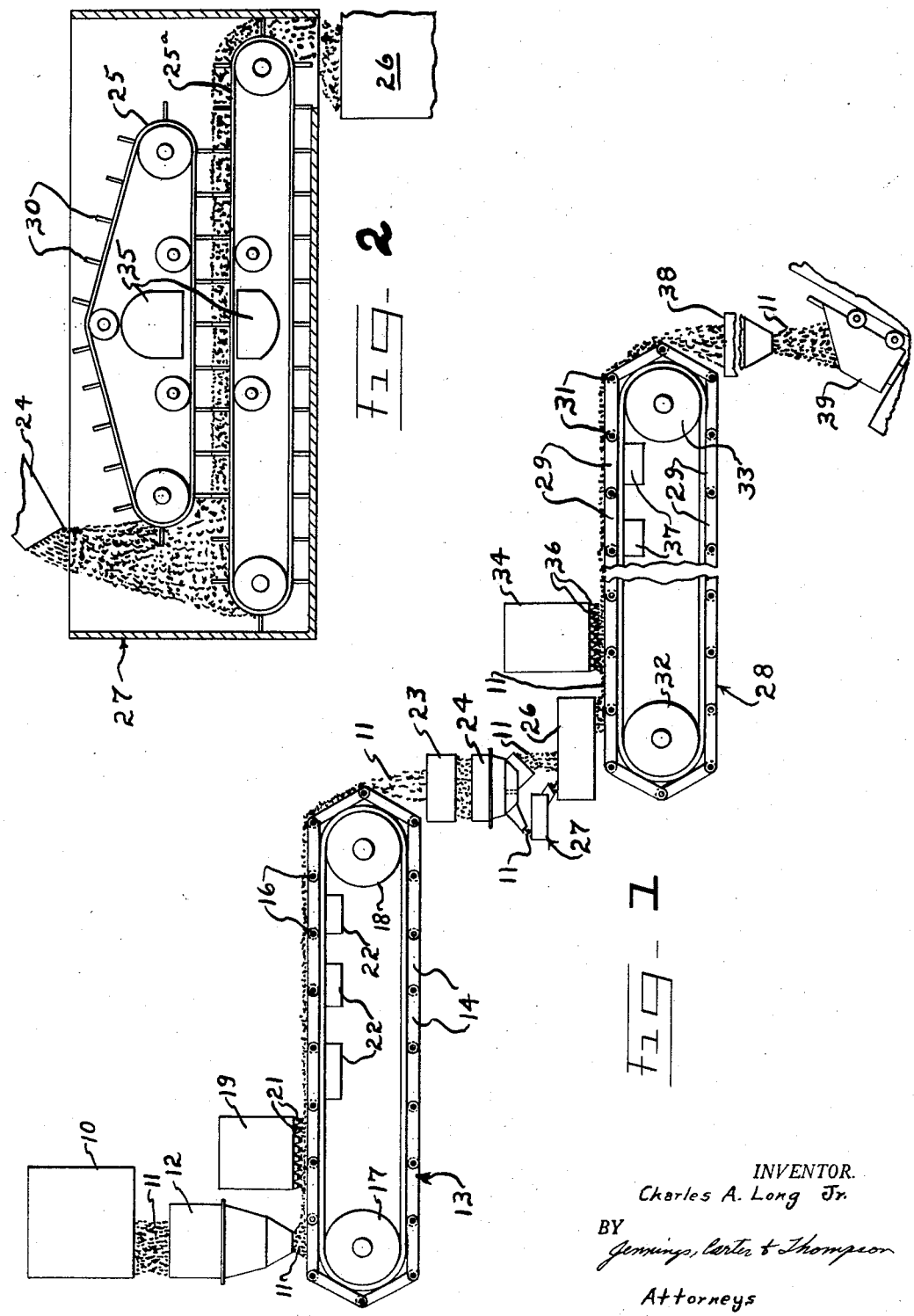
INVENTOR.
Charles A. Long Jr.
BY
Jennings, Carter & Thompson
Attorneys

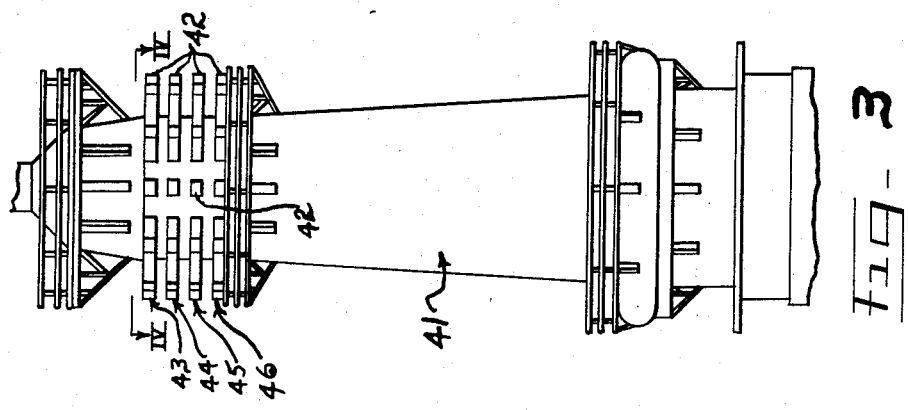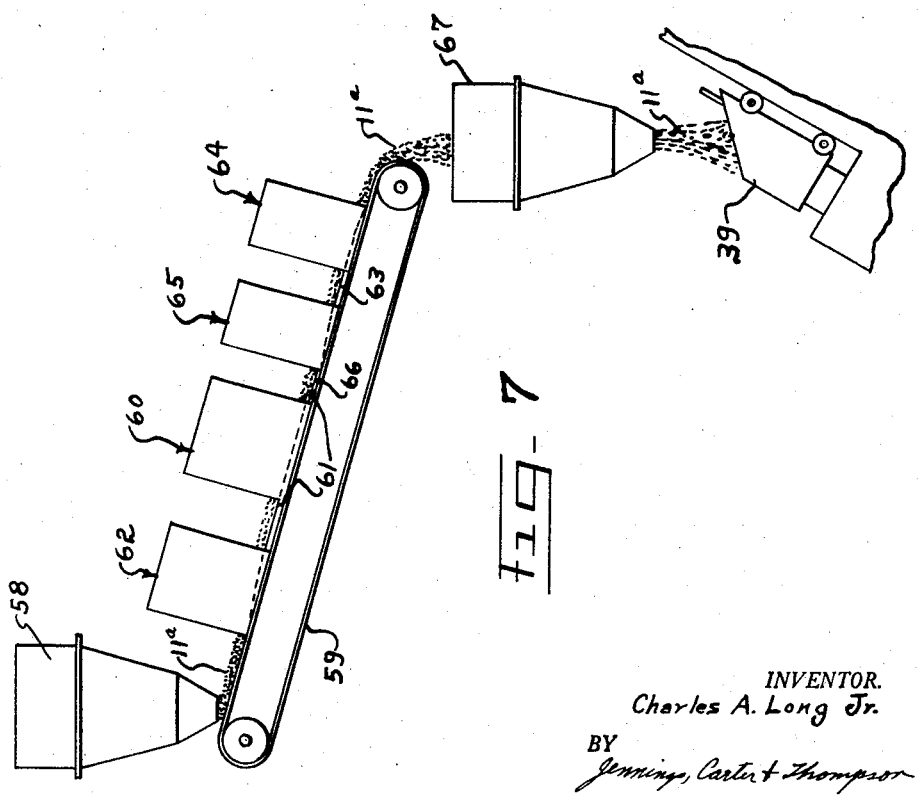

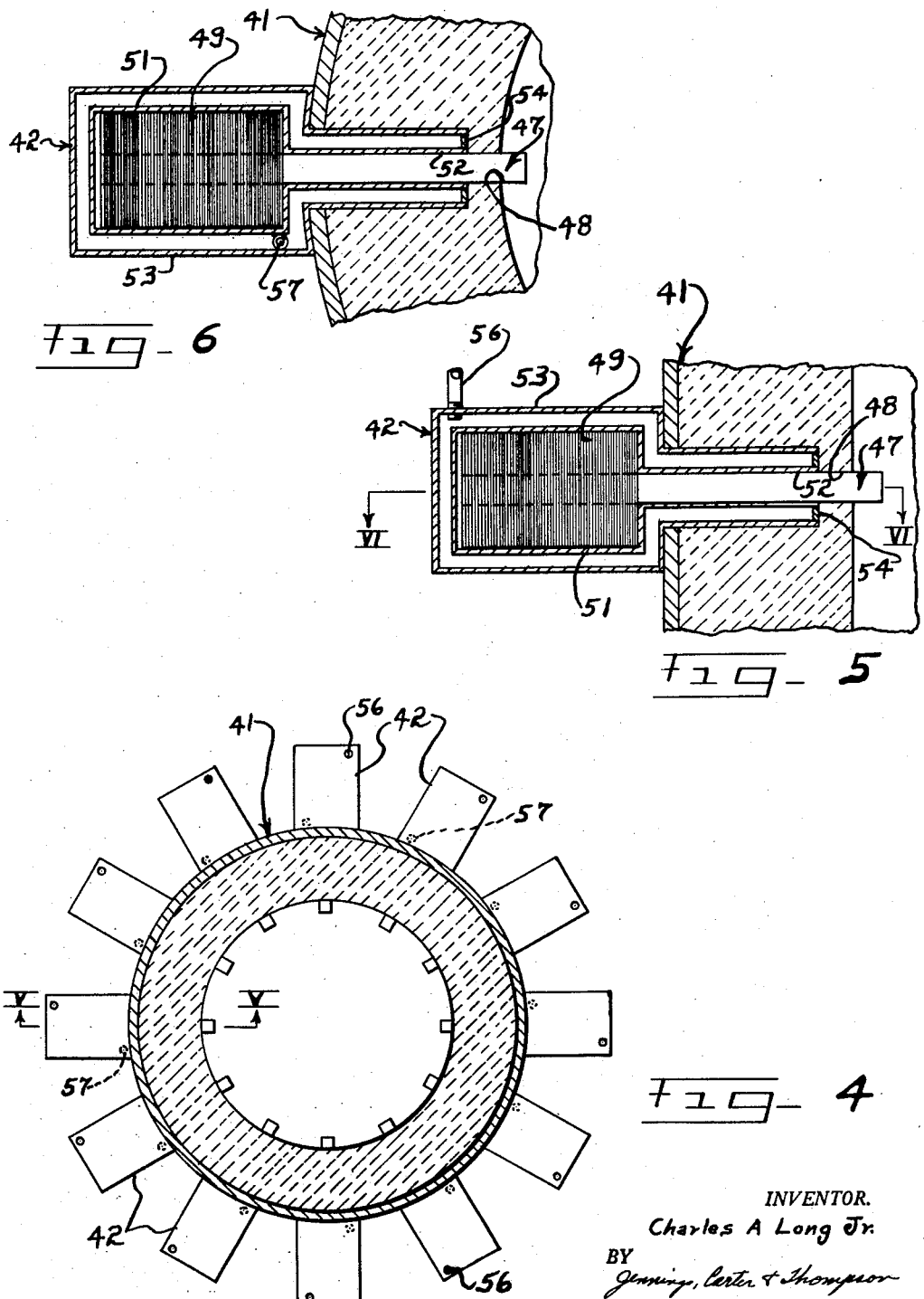

United States Patent Office 2,911,296
Patented Nov. 3, 1959

2,911,296

PROCESS AND APPARATUS FOR TREATING IRON ORE

Charles A. Long, Jr., Birmingham, Ala.

Application January 7, 1957, Serial No. 632,927

17 Claims. (Cl. 75—5)

This invention relates to a process and apparatus for treating iron ore and more particularly to the treatment of small particle size iron ore.

An object of my invention is to provide a process and apparatus of the character designated in which fine particles of non-magnetic iron ore are so pretreated as to render them capable of being magnetically restrained against upward movement while a hot reducing gas is passed through a mass of such ore, thus preventing the small particles of ore from being blown out of the apparatus before the particles have agglomerated to a size sufficient to overcome the lifting effect of the reducing gases.

Another object of my invention is to provide a process and apparatus for treating small particle size iron ore or combined particles of ore and coke in which the small particles are agglomerated to produce a porous sinter of uniform size.

Another object of my invention is to provide a process and apparatus of the character designated in which the ore particles are pretreated using heat and an oxygen reducing agent to produce magnetite, ferrous oxide and metallic iron which can be premagnetized prior to sintering the same, thereby speeding up the agglomeration of the ore particles or ore particles and a suitable additive, such as coke whereby the sintering operation is carried out in a minimum of time.

Another object of my invention is to provide a process and apparatus for treating small particle size iron ore which shall include a movable grate for heating a mixture of coke and ore whereby the iron ore is partially reduced, thus permitting magnetization of a portion of the ore and shall include a second movable grate for heating the mixture thus magnetized in addition to the remainder of the mixture whereby the ore and coke particles are agglomerated and fused together.

A more specific object of my invention is to provide apparatus of the character designated in which the movable grates on which the ore is agglomerated and fused are associated with updraft blowers, whereby the most intense heat is thrown away from the sintering grates.

Another object of my invention is to provide a process and apparatus for treating small particle size iron ore in which the pretreated ore particles are converted into particles which can be magnetized and then are introduced into an upwardly moving column of a reducing gas within a reducing chamber and the movement of such ore particles is restrained magnetically until the particles agglomerate to sufficient mass to overcome the upward thrust of the reducing gases.

A further object of my invention is to provide a process and apparatus of the character designated in which the pretreated ore particles or combined particles of ore and coke are shifted laterally within the reducing chamber relative to the upwardly moving gases, thus preventing channeling of the upwardly moving gases.

A further object of my invention is to provide a process and apparatus of the character designated in which the small particle size iron ore, which has been pretreated and converted into material that can be magnetized, is drawn downwardly in a controlled manner by providing magnetic fields having progressively increasing strengths in a downward direction.

A still further object of my invention is to provide apparatus of the character designated which shall be simple of construction, economical of manufacture and which may be readily applied to conventional type ore reducing apparatus.

Heretofore in the art to which my invention relates, various processes and apparatus have been devised for treating small particles of ore such as by incorporating additives to form sufficient mass to overcome the upward thrust of the reducing gases in a blast furnace or the like. Such processes have been unsatisfactory due to the fact that such additives interfere with the reduction of the ore and incur additional handling and treatment of the ore.

I overcome the above and other difficulties by providing a process and apparatus for treating small particle size iron ore whereby the ore is first preheated in the presence of an oxygen reducing agent where the small ore particles are changed into magnetite, ferrous oxide, metallic iron and other products that can be magnetized and/or attracted to an electromagnet and is then magnetized prior to sintering the same by heat. Preferably, the ore is combined with a sintering material, such as coke prior to sintering. The ore may be sintered or the combined coke and ore mixture may be further treated by passing the same downwardly in countercurrent flow to upwardly moving hot reducing gases which normally tend to blow the small particle size ore outwardly of the reducing apparatus. To prevent the treated ore particles from being blown out, I magnetically restrain movement thereof until the particles agglomerate to form sufficient mass to overcome the upward thrust of the reducing gases. To prevent channeling of the upwardly moving reducing gases, the strength of the magnetic field is varied angularly whereby the treated ore particles shift laterally within the reduction chamber relative to the upwardly moving reducing gases.

Apparatus embodying features of my invention and which may be employed to carry out my improved process is illustrated in the accompanying drawings forming a part of this application, in which:

Fig. 1 is a side elevational view showing somewhat diagrammatically the apparatus for pretreating the ore prior to the introduction thereof to the reduction chamber;

Fig. 2 is an enlarged view, partly in section, showing the means for premagnetizing the ore;

Fig. 3 is a side elevational view, partly broken away, showing a blast furnace having my improved apparatus associated therewith;

Fig. 4 is a sectional view taken generally along the line IV—IV of Fig. 3;

Fig. 5 is a sectional view taken generally along the line V—V of Fig. 4;

Fig. 6 is a sectional view taken generally along the line VI—VI of Fig. 5; and,

Fig. 7 is a side elevational view showing a modified form of apparatus for pretreating the ore prior to the introduction thereof into the reduction chamber.

Referring now to the drawings for a better understanding of my invention, I show a mixer 10, which may be in the form of a pug mill for forming a mixture 11 comprising small particle size iron ore and coke. The ore and coke mixture is introduced into a hopper 12 from which it is discharged onto the receiving end of a moving grate 13. As shown in Fig. 1, the moving grate 13 comprises a plurality of sections 14 which are pivotally connected to each other by any suitable means, such as by pins 16. The movable grate 13 passes around pulleys, or the like, 17 and 18 and is driven by any suitable means, not shown.

Mounted above the receiving end of the movable grate 13 is a flash heater 19 having suitable burners 21 for igniting the mixture 11 as it is introduced onto the movable grate. Preferably, the layer of the mixture 11 on the movable grate is approximately 2 inches in thickness. Air is drawn downwardly through the material 11 on the grate 13 by suitable suction means indicated generally at 22 whereby combustion of the mixture 11 is continued for a short period of time after being ignited by the burners 21, thus resulting in a mixture comprising ferrous oxide, metallic iron, magnetite and coke and other materials that can be magnetized and are adapted to be attracted to an electromagnet.

The mixture 11 is discharged from the movable grate 13 into a cooler 23 where the mixture is cooled. From the cooler 23 the mixture 11 passes into a hopper 24 where a substantial portion thereof is fed into a mixer 26. The other portion of the mixture 11 is transferred from the hopper 24 to a magnetizer 27, which may be in the form of an impulse magnetizer comprising two non-magnetic belt conveyers 25 and 25a which parallel each other and have suitable cleats 30 thereon forming pockets for carrying the pretreated ore through a strong magnetic field indicated generally at 35. The belt conveyers 25 and 25a are driven by any suitable means, not shown. The portion of the mixture 11 passing through the magnetizer 27 is then introduced into the mixer 26 along with the remainder of the mixture 11 from hopper 24 where the magnetized portion is intimately mixed with the portion of the mixture which passes directly from the hopper 24 into the mixer 26. Preferably, approximately one-fourth of the mixture 11 is transferred from the hopper 24 into the magnetizer 27 while approximately ¾ of the mixture is transferred directly to the mixer 26.

Positioned beneath the mixer 26 in position to receive the mixture 11 from the mixer 26 is a second movable grate 28 having individual sections 29 which are pivotally connected by suitable transverse pins 31. The movable grate 28 is also mounted for movement about suitable pulleys 32 and 33 which are propelled by any suitable means, not shown.

Mounted above the movable grate 28 adjacent the point the mixture 11 is placed on the grate is a second flash heater 34 having suitable burners 36 for igniting the mixture 11. Mounted beneath the upper flight of the grate 28 are suitable blowers 37 for passing a stream of air upwardly through the grate sections 29 and the mixture 11 of coke and ore whereby combustion thereof is continued for a short period of time after the mixture is ignited by the burners 36.

In view of the fact that a portion of the pretreated ore particles passing onto the movable grate 28 is magnetized, this portion of the mixture attracts the unmagnetized portion of the mixture whereby the particles are agglomerated by magnetic attraction into units of approximately one inch diameter where the units are fused together by the heat of combustion after the mixture passes the burners 36. The ore and coke mixture 11 thus sintered is transferred from the movable grate 28 into a suitable storage hopper 38 where the mixture is transferred to suitable skips 39 which transfer the treated mixture to the upper end of a blast furnace indicated generally at 41.

Mounted adjacent the upper end of the blast furnace 41 are electro-magnets 42. As shown in Figs. 3 and 4, the electro-magnets 42 are spaced angularly from each other to form vertically spaced annular rows of electro magnets 43, 44, 45 and 46 which surround the upper end of the blast furnace. The annular rows of magnets are spaced vertically from each other, as shown in Fig. 3, and the strengths of the magnets forming the annular rows are progressively stronger in a downward direction. That is, the individual magnets forming the annular row 44 are stronger than the individual magnets forming the annular row 43. In like manner, the magnets of the row 45 are stronger than the magnets of row 44 and the magnets of row 46 are stronger than the magnets of row 45.

Each individual magnet 42 comprises a core element 47 which extends through a suitable opening 48 provided in the vertical wall of the blast furnace 41. The core element 47 projects inwardly and outwardly of the blast furnace, as shown in Figs. 5 and 6 and mounted on the outwardly projecting portion thereof are a plurality of coils of insulated wire 49 which complete the electromagnet. Surrounding the outwardly projecting ends of the core elements 47 and the coils of wire 49 is a housing 51 which extends inwardly of the wall of the blast furnace alongside the core element 47, as at 52. Surrounding and spaced from the housing 51 is an outer housing 53 which also extends inwardly of the blast furnace wall and is connected to the inner housing 51 by an annular plate 54. Communicating with the outer housing 53 are inlet conduits 56 and outlet conduits 57 for circulating a suitable cooling medium between the housings whereby the coils of insulated wire 49 are further protected from the heat.

From the foregoing description, the operation of my improved process shown in Figs. 1 through 6 will be readily understood. The small particle size ore and coke mixture 11 is introduced into the mixer 10 where the particles are thoroughly mixed with each other. The mixture 11 is transferred from the mixer 10 to a hopper 12 and then passes onto the receiving end of the movable grate 13 where it is ignited by the burners 21. As the mixture of ore and coke passes toward the delivery end of the movable grate 13, the downward stream of air imparted by the suction means 22 continues the combustion of the mixture while the mixture is on the movable grate reducing the small iron ore particles into material that can be magnetized. The mixture 11 is discharged from the movable grate 13 into the cooler 23 where the material is cooled. The material thus cooled is transferred to the hopper 24 where a portion thereof passes through the magnetizer 27 and then into the hopper 26. The remainder of the mixture in the hopper 24 passes directly to the mixer 26. In the mixer 26, the magnetized mixture is mixed intimately with the unmagnetized portion of the mixture and is then introduced onto the receiving end of the movable grate 28 where it is ignited by the burners 36. The updraft of air imparted by the blowers 37 continues the combustion of the mixture while the mixture is on the grate 28. By providing an updraft of air, the intense heat is blown upwardly away from the sintering grate sections 29, thus increasing greatly the life of the grates. As the ore and coke mixture 11 is being transferred along the movable grate 28, the magnetized portion of the mixture 11 attracts the unmagnetized portion resulting in a magnetically fixed mixture of units approximately one inch in diameter; then the intense heat causes the particles of the mixture to be agglomerated and fused together. From the movable grate 28, the mixture is transferred to the storage hopper 38 where it is dumped into skips 39, or the like, for transferring the material into the upper end of the blast furnace 41, or other suitable reducing chamber.

As the mixture 11 enters the upper end of the blast furnace 41 it passes in countercurrent flow to upwardly moving reducing gases. The electro-magnets 42 are energized whereby movement of the particles of the mixture are magnetically restrained until they agglomerate or are attracted to each other to form sufficient mass to overcome the upward thrust of the reducing gases. In view of the fact that the magnets of the annular rows 43, 44, 45 and 46 are progressively stronger in a downward direction, the agglomerated particles of the mixture 11 are continuously drawn downwardly in a controlled manner until the ore particles have agglomerated further to form sufficient mass to overcome the upward thrust of the reducing gases. That is, as the ore particles combine and increase in mass, the downward pull of the subjacent magnets in addition to the pull of gravity causes the ore and coke mixture to move downwardly in a controlled manner until they pass the lowermost row 46 of magnets. By this time, the ore particles have agglomerated to form sufficient mass to overcome the upward thrust of the reducing gases.

To prevent channelling of the upwardly moving gases as they pass through the magnetically restrained agglomerated particles, the magnetic field imparted by the magnets is shifted to angular positions relative to the downwardly moving ore whereby the ore is shifted laterally and agitated. This can be accomplished by suitable control means, not shown, for energizing and de-energizing selected ones of the individual magnets whereby the magnetic field is shifted to selected angular positions, such as at opposite sides of the reaction chamber. Also, the strength of the individual magnets can be selectively increased or decreased whereby the magnetic field imparted by the magnets is stronger at one angular position than at another angular position relative to the downwardly moving particles.

Referring now to Fig. 7 of the drawing, I show a slightly modified form of apparatus for pretreating the ore mixture. The small ore particles indicated at 11a are introduced into a hopper 58 where they pass onto an endless conveyor indicated generally at 59. The endless conveyor is inclined, as shown, and mounted above the conveyor adjacent the receiving end thereof is an inclined, vibrating platform 61 which transfers the ore through a preheating chamber indicated generally at 62. Mounted above the discharge end of the platform 61 is a deoxidizing chamber 60 for introducing a suitable deoxidizing agent such as carbon monoxide into the heated ore thus changing the ore particles into material which can be magnetized. If desired, the deoxidizing chamber 60 may be omitted and small particle size coke may be added to the mixture 11a to produce partial reduction of the iron ore particles.

Mounted above the upper flight of the conveyor 59 in position to receive the mixture 11a after it has passed through the preheating chamber 62 and the deoxidizing chamber 60 is an inclined vibrating platform 63 which conveys the ore through a cooling unit 65 then to a suitable magnetizer, such as an impulse magnetizer indicated diagrammatically at 64. Where the ore particles have been partially reduced they are adapted for magnetization, thus permitting the same to be passed directly to the blast furnace 41 or through the magnetizer 64. The ore is transferred from the vibrating platform 61 onto the vibrating platform 63 by means of a short platform 66 which extends beneath the discharge end of the platform 61 and above the receiving end of the platform 63.

After passing through the magnetizer 64, the mixture 11a passes into a storage hopper 67 where it is transferred to the skips 39 which transfer the premagnetized ore mixture to the blast furnace 41 in the manner described heretofore with regard to the ore and coke mixture 11.

The premagnetized mixture 11a passes downwardly in countercurrent flow to the upwardly moving reducing gases and the magnets 42 restrain movement of the mixture until the ore particles have agglomerated to form sufficient mass to overcome the upward thrust of the reducing gases. That is to say, the operation of the blast furnace 41, or other suitable reducing chamber, where the premagnetized ore mixture 11a is employed is substantially the same as the operation thereof where the ore and coke mixture 11 described heretofore is employed.

In view of the foregoing, it will be seen that I have devised an improved process and apparatus for pretreating small particle size iron ore or for use in the complete reduction of small particle size ore by passing the ore particles after they have agglomerated to form sufficient mass to overcome the upward thrust of the reducing gases downwardly through the reducing chamber in the usual manner. Where ore is employed which is already magnetizable, such as blast furnace flue dust or magnetite, the pretreatment may be omitted. The magnetizable ore is then introduced at the upper end of the blast furnace, or other reduction chamber, where movement thereof is restrained by the electromagnets until agglomeration takes place in the manner described heretofore. By magnetically restraining movement of the ore particles until they have agglomerated to form sufficient mass to overcome the upward thrust of the gases, the ore is not blown out of the reducing chamber, thereby reducing to a minimum the loss of the small ore particles during the treatment thereof. Also, by providing vertically spaced annular rows of electro magnets which are progressively stronger in a downward direction, the ore particles are continuously drawn downwardly in a controlled manner until the mass thereof is sufficient to overcome the upward thrust of the reducing gases.

By energizing and de-energizing or varying the strength of selective ones of the magnets at selected angular positions relative to the downwardly moving treated ore, or mixture of ore and coke, the mixture is shifted laterally within the reaction chamber thus agitating the same and preventing channeling of the upwardly moving gases.

By mixing the ore with coke and then flash heating the same whereby combustion is continued for a short period of time and then passing a portion of the preheated ore through a magnetizer, the unmagnetized portion of the ore is attracted by the magnetized portion when they are remixed. Also, by passing the mixture of magnetized iron ore and non-magnetized ore and coke onto the movable grate and reheating the same whereby combustion is again continued for a short period of time, the ore and coke particles are attracted to each other whereby they are agglomerated and fused together by the heat of combustion.

Furthermore, I have found that by mixing the coke with the ore prior to the treatment thereof, the resulting sintered product is porous and of a uniform size, thus facilitating greatly the reduction of the sintered product.

While I have shown my invention in but two forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. The process of treating small particle size iron ore which comprises the steps of mixing said ore with particles of coke, heating the mixture of coke and ore to a temperature at which the ore is made magnetizable, passing a gaseous stream through said mixture after heating the same to reduce partially the ore particles whereby combustion is continued for a short period of time, cooling said mixture, magnetizing at least a portion of said ore in said mixture, heating said mixture of coke and ore after magnetizing said portion of ore to ignite said mixture, and passing a gaseous stream through said mixture after it has been ignited to reduce the ore particles whereby combustion is continued for a short period of time and the coke and ore particles are agglomerated and fused together.

2. The process of treating small particle size iron ore which comprises the steps of mixing said ore with particles of coke, heating the mixture of coke and ore to a temperature at which the ore is made magnetizable, magnetizing at least a portion of said ore after said heating, reheating said mixture of coke and ore after magnetizing said portion of ore to reduce partially the ore particles whereby the coke and ore particles are agglomerated and fused together, and passing the agglomerated ore and coke particles downwardly in countercurrent flow to upwardly moving hot reducing gases to reduce partially the ore particles, and magnetically restraining movement of the agglomerated ore and coke particles until they agglomerate further to form sufficient mass to overcome the upward thrust of said reducing gases.

3. The process of treating small particle size iron ore which comprises the steps of preheating the ore to a temperature at which the ore is made magnetizable in the presence of a reducing agent to reduce partially the ore, magnetizing the preheated ore, passing the ore after magnetization thereof downwardly in countercurrent flow to upwardly moving hot reducing gases, magnetically restraining initial movement of the ore by creating a magnetic field adjacent the point said ore first contacts said reducing gases whereby the ore particles agglomerate, and progressively increasing the strength of the magnetic field in a downward direction whereby the agglomerated ore particles are drawn downwardly in a controlled manner until the ore particles agglomerate to form sufficient mass to overcome the upward thrust of said reducing gases.

4. The process as defined in claim 3 in which the ore particles are mixed with particles of coke prior to preheating the same.

5. The process of treating small particle size iron ore which comprises the steps of preheating the ore to a temperature at which the ore is made magnetizable in the presence of an oxygen reducing agent to reduce the ore, magnetizing the preheated ore, passing the ore after magnetization thereof downwardly in countercurrent flow to upwardly moving hot reducing gases to reduce the ore further, magnetically restraining initial movement of the ore by creating a magnetic field adjacent the point said ore first contacts said reducing gases until the ore particles agglomerate to form sufficient mass to overcome the upward thrust of said reducing gases, and shifting the magnetic field horizontally to angular positions relative to the downwardly passing ore whereby the ore shifts laterally to prevent channelling of said upwardly moving gases.

6. The process as defined in claim 5 in which the ore particles are mixed with particles of coke prior to preheating the same.

7. Apparatus for treating small particle size iron ore comprising a mixer for mixing said ore with coke, a movable grate, means for transferring the ore and coke mixture from said mixer to said grate, means for flash heating said mixture while on said grate, means for passing a gaseous stream through said mixture while on said grate whereby combustion of the mixture is continued for a short period of time, means for cooling said mixture, a magnetizer disposed to receive at least a portion of the cooled mixture, a second mixer disposed to receive the portion of the mixture passing through the magnetizer and the remainder of said mixture, a second movable grate disposed to receive the ore and coke mixture from said second mixer, means for flash heating said mixture while on said second grate, and means for passing a gaseous stream through said mixture on said second grate whereby the coke and ore particles are agglomerated and fused together.

8. Apparatus for treating small particle size iron ore comprising a mixer for mixing said ore with coke, a movable grate, means for transferring the ore and coke mixture from said mixer to said grate, means for flash heating said mixture while on said grate, means for passing a gaseous stream through said mixture while on said grate whereby combustion of the mixture is continued for a short period of time, means for cooling said mixture, a magnetizer disposed to receive at least a portion of the cooled mixture, a second mixer disposed to receive the portion of the mixture passing through the magnetizer and the remainder of said mixture, a second movable grate disposed to receive the ore and coke mixture from said second mixer, means for flash heating said mixture while on said second grate, means for passing a gaseous stream through said mixture on said second grate whereby the coke and ore particles are agglomerated and fused together, a reaction chamber, means for introducing the agglomerated coke and ore particles, adjacent the upper end of said chamber, means for passing a reducing gas upwardly through said chamber, means for imparting a magnetic field adjacent the upper end of said chamber whereby movement of the ore is restrained until the ore particles agglomerate to form sufficient mass to overcome the upward thrust of said reducing gases.

9. Apparatus for treating small particle size iron ore comprising a mixer for mixing the ore with coke, a movable grate, means for transferring the ore and coke mixture from said mixer onto said grate, a flash heater adjacent the receiving end of said grate, means for passing a gaseous stream down through said mixture while on said grate whereby combustion of the mixture is continued for a short period of time, a cooler adjacent the delivery end of said grate, a magnetizer disposed to receive at least a portion of the cooled mixture, a second mixer disposed to receive the portion of the mixture passing through the magnetizer and the remainder of said mixture, a second movable grate disposed to receive the ore and coke mixture from said second mixer, a second flash heater adjacent the receiving end of said second grate, and means for passing a gaseous stream upwardly through said mixture while on said second grate whereby the coke and ore particles are agglomerated and fused together.

10. Apparatus for treating small particle size iron ore comprising a preheating chamber for preheating said ore, means for supplying an oxygen reducing agent to said preheating chamber, a magnetizer disposed to receive the preheated ore and magnetize the same, a reaction chamber, means for passing a reducing gas upwardly through said chamber, means for introducing the ore after magnetization thereof adjacent the top of said chamber, a plurality of vertically spaced annular rows of magnets mounted adjacent the upper end of said chamber, the strength of each row of magnets being progressively greater toward the lower end of said chamber whereby the ore particles are drawn downwardly in a controlled manner until they agglomerate to form sufficient mass to overcome the upward thrust of said reducing gases.

11. Apparatus as defined in claim 10 in which means is provided for energizing and deenergizing selected ones of the magnets whereby the magnetic field imparted by the magnets can be shifted horizontally to angular positions relative to the downwardly moving ore to agitate the ore and prevent channeling of the upwardly moving gas.

12. Apparatus as defined in claim 10 in which means is provided for varying the strength of selected ones of the magnets whereby the magnetic field imparted by the magnets can be varied horizontally at angular positions relative to the downward moving ore to shift the ore laterally and prevent channeling of the upwardly moving gas.

13. Apparatus for treating small particle size iron ore comprising a preheating chamber for heating said ore, means for supplying an oxygen reducing agent to said preheating chamber, a magnetizer disposed to receive the preheated ore and magnetize the same, a vertically extending reaction chamber, means for passing a reducing gas upwardly through said chamber, means for introducing the ore after magnetization thereof adjacent the top of said chamber, a plurality of vertically spaced electromagnets mounted adjacent the upper end of said chamber and being of a progressively greater strength from the upper end of the chamber whereby the ore particles are drawn downwardly in a controlled manner until they agglomerate to form sufficient mass to overcome the upward thrust of said reducing gas, and means for cooling said electro-magnets.

14. Apparatus as defined in claim 13 in which the magnets are surrounded by cooling jackets for circulating a cooling medium adjacent the magnets.

15. Apparatus for treating at least partially magnetized small particle size iron ore comprising a vertically extending reaction chamber, means for passing a reducing gas upwardly through said chamber, means for introducing said iron ore adjacent the top of said chamber, and a plurality of vertically spaced magnets mounted adjacent the upper end of said chamber, the strength of the magnets being progressively greater from the upper end of said chamber whereby the ore particles are drawn downwardly in a controlled manner until they agglomerate to form sufficient mass to overcome the upward thrust of said reducing gas.

16. Apparatus for treating magnetized small particle size iron ore comprising a vertically extending reaction chamber, means for passing a reducing gas upwardly through said chamber, means for introducing the magnetized ore adjacent the top of said chamber, a plurality of vertically spaced magnets mounted adjacent the upper end of the chamber, the strength of said magnets being progressively greater from the upper end and upon initial contact of the reducing gas with the ore particles, the movement of the ore is restrained until the ore particles agglomerate to form sufficient mass to overcome the upward thrust of the reducing gas, and means for varying the strength of selected magnets to shift the magnetic field horizontally and prevent channeling of the upwardly moving gas.

17. The process of treating small particle size magnetized iron ore comprising passing the ore particles downwardly in a countercurrent flow to upwardly moving hot reducing gases, magnetically restraining initial movement of the ore particles by creating a magnetic field adjacent the point said ore particles first contact said reducing gases whereby the ore particles agglomerate, and progressively increasing the strength of the magnetic field in a downward direction whereby the agglomerated ore particles are drawn downwardly in a controlled manner until the ore particles agglomerate to form sufficient mass to overcome the upward thrust of said reducing gases.

References Cited in the file of this patent
UNITED STATES PATENTS

| | | |
|---|---|---|
| 133,099 | Hay | Nov. 19, 1872 |
| 1,036,137 | Moxham | Aug. 20, 1912 |
| 2,143,905 | Ahlmann | Jan. 17, 1939 |
| 2,441,383 | Babb | May 11, 1948 |
| 2,456,136 | Manegold et al. | Dec. 14, 1948 |
| 2,717,205 | Edwards | Sept. 6, 1955 |